(12) United States Patent
Spina et al.

(10) Patent No.: US 9,069,372 B2
(45) Date of Patent: Jun. 30, 2015

(54) CUSTOMIZABLE PEDAL SYSTEM

(75) Inventors: Pasquale Spina, Laval (CA); Brad Linton, Mansfield, TX (US)

(73) Assignee: BELL HELICOPTER TEXTRON INC., Hurst, TX (US)

( * ) Notice: Subject to any disclaimer, the term of this patent is extended or adjusted under 35 U.S.C. 154(b) by 989 days.

(21) Appl. No.: 12/514,813

(22) PCT Filed: Nov. 14, 2007

(86) PCT No.: PCT/US2007/084606
§ 371 (c)(1),
(2), (4) Date: Feb. 2, 2010

(87) PCT Pub. No.: WO2008/061110
PCT Pub. Date: May 22, 2008

(65) Prior Publication Data
US 2010/0126298 A1 May 27, 2010

Related U.S. Application Data

(60) Provisional application No. 60/858,698, filed on Nov. 14, 2006.

(51) Int. Cl.
G05G 1/30 (2008.04)
G05G 1/46 (2008.04)
B64C 13/06 (2006.01)

(52) U.S. Cl.
CPC .............. *G05G 1/46* (2013.01); *Y10T 74/20528* (2015.01); *Y10T 74/2039* (2015.01); *B64C 13/06* (2013.01)

(58) Field of Classification Search
USPC .............. 74/478, 478.5, 490.14, 490.15, 560, 74/594.1, 594.4, 594.7; 244/234, 235, 236
See application file for complete search history.

(56) References Cited

U.S. PATENT DOCUMENTS 3,129,605 A * 4/1964 Bonnell, Jr. et al. ......... 74/501.6
3,377,881 A * 4/1968 Lucas .............................. 74/512
3,378,938 A   4/1968 Frasca
3,576,302 A * 4/1971 Palfreyman ................... 244/236

(Continued)

FOREIGN PATENT DOCUMENTS

GB           925225          5/1963

OTHER PUBLICATIONS

International Search Report for PCT/US2007/084606, issued on Jul. 1, 2008.

(Continued)

*Primary Examiner* — Vicky Johnson
(74) *Attorney, Agent, or Firm* — Pillsbury Winthrop Shaw Pittman LLP

(57) ABSTRACT

A pedal system including a support base, a first lever including a root portion and a terminal portion formed such that the terminal portion interfaces with the root portion at a bend in the first lever of a first predetermined angle, the root portion of the first lever being pivotally mounted to the support base such that the first lever is rotatable in a first plane of rotation about an axis of rotation at or near the support base, a second lever including a root portion and a terminal portion formed such that the terminal portion interfaces with the root portion at a bend in the second lever of a second predetermined angle, the root portion of the second lever being pivotally mounted to the support base such that the second lever is rotatable in a second plane of rotation about the axis of rotation.

20 Claims, 3 Drawing Sheets

(56) References Cited

U.S. PATENT DOCUMENTS

| | | | |
|---|---|---|---|
| 3,643,524 A | | 2/1972 | Herring |
| 4,192,476 A | | 3/1980 | Byers |
| 4,574,649 A | * | 3/1986 | Seol .................................. 74/138 |
| 4,973,046 A | * | 11/1990 | Maxwell .......................... 482/60 |
| 5,056,742 A | | 10/1991 | Sakurai |
| 5,161,430 A | * | 11/1992 | Febey ........................... 74/594.7 |
| 5,458,022 A | * | 10/1995 | Mattfeld et al. .............. 74/594.1 |
| 5,566,589 A | * | 10/1996 | Buck ............................. 74/594.1 |
| 2003/0121354 A1 | | 7/2003 | Ouyang et al. |
| 2006/0027994 A1 | | 2/2006 | Misevski |

OTHER PUBLICATIONS

Written Opinion of the International Searching Authority for PCT/US2007/084606, issued on Jul. 1, 2008.

Office Action issued Dec. 19, 2013, in copending Canadian Application No. 2,669,168 (three pages).

Canadian Office Action dated Apr. 4, 2014 in corresponding Canadian Patent Application No. 2,669,168.

* cited by examiner

US 9,069,372 B2

CUSTOMIZABLE PEDAL SYSTEM

CROSS REFERENCE TO RELATED APPLICATIONS

This is the U.S. National Phase of PCT/US2007/084606, filed Nov. 14, 2007, which in turn claims priority to U.S. provisional application No. 60/858,698, filed Nov. 14, 2006, the contents of both of which are incorporated herein in their entirety by reference.

FIELD OF THE INVENTION

The invention relates to a pedal system that provides pedals that are engageable by a user to input information to a control system.

BACKGROUND OF THE INVENTION

Pedal systems that provide pedals that are engageable by a user are known. For example, these types of systems are typically be employed to enable users to input information to aviation control systems (e.g., within helicopters, within fixed-wing aircraft, etc.). However, these systems do not enable an appropriate level of customization to comfortably accommodate users of different anatomical geometries and/or preferences. Additionally, some of these systems may be bulky and uncomfortable for users. These and other drawbacks associated with known pedal systems exist.

SUMMARY

One aspect of the invention may relate to a pedal system comprising a support base; a first lever comprising a root portion and a terminal portion formed such that the terminal portion interfaces with the root portion at a bend in the first lever of a first predetermined angle, the root portion of the first lever being pivotally mounted to the support base such that the first lever is rotatable in a first plane of rotation about an axis of rotation at or near the support base;
a second lever comprising a root portion and a terminal portion formed such that the terminal portion interfaces with the root portion at a bend in the second lever of a second predetermined angle, the root portion of the second lever being pivotally mounted to the support base such that the second lever is rotatable in a second plane of rotation about the axis of rotation, wherein the second plane of rotation is substantially parallel to the first plane of rotation; a first pedal configured to be engaged by a foot of a user to rotate the first lever about the axis of rotation, the first pedal being attached to the first lever to extend therefrom in a direction that is (i) away from the second lever, and (ii) roughly parallel to the axis of rotation, the first pedal being attached to the first lever such that the position of the first pedal is adjustable along the terminal portion of the first lever; a second pedal configured to be engaged by a foot of the user to rotate the second lever about the axis of rotation, the second pedal being attached to the second lever to extend therefrom in a direction that is (i) away from the first lever, and (ii) roughly parallel to the axis of rotation, the second pedal being attached to the second lever such that the position of the second pedal is adjustable along the terminal portion of the second lever separate from the adjustment of the first pedal along the terminal portion of the first lever.

Another aspect may relate to A pedal system comprising a support base; a first lever comprising a root portion and a terminal portion, the root portion of the first lever being pivotally mounted to the support base such that the first lever is rotatable as a single body in a first plane of rotation about an axis of rotation at or near the support base; a second lever comprising a root portion and a terminal portion, the root portion of the second lever being pivotally mounted to the support base such that the second lever is rotatable as a single body in a second plane of rotation about the axis of rotation, wherein the second plane of rotation is substantially parallel to the first plane of rotation; a first pedal configured to be engaged by a foot of a user to rotate the first lever about the axis of rotation from a default rotational orientation about the axis of rotation, wherein the first lever is coupled to a crank such that rotation of the first lever from the default rotational orientation actuates the crank, the first pedal being attached to the first lever to extend therefrom in a direction that is (i) away from the second lever, and (ii) roughly parallel to the axis of rotation, the first pedal being attached to the first lever such that the position of the first pedal is adjustable along the first lever; a second pedal configured to be engaged by a foot of the user to rotate the second lever about the axis of rotation from the default rotational orientation about the axis of rotation, wherein the second lever is coupled to the crank such that rotation of the second lever from the default rotational orientation actuates the crank, the second pedal being attached to the second lever to extend therefrom in a direction that is (i) away from the first lever, and (ii) roughly parallel to the axis of rotation, the second pedal being attached to the second lever such that the position of the second pedal is adjustable along the terminal portion of the second lever separate from the adjustment of the first pedal along the terminal portion of the first lever; and an adjustment assembly that enables the user to adjust the default rotational orientation of the first and second levers without actuating the crank.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
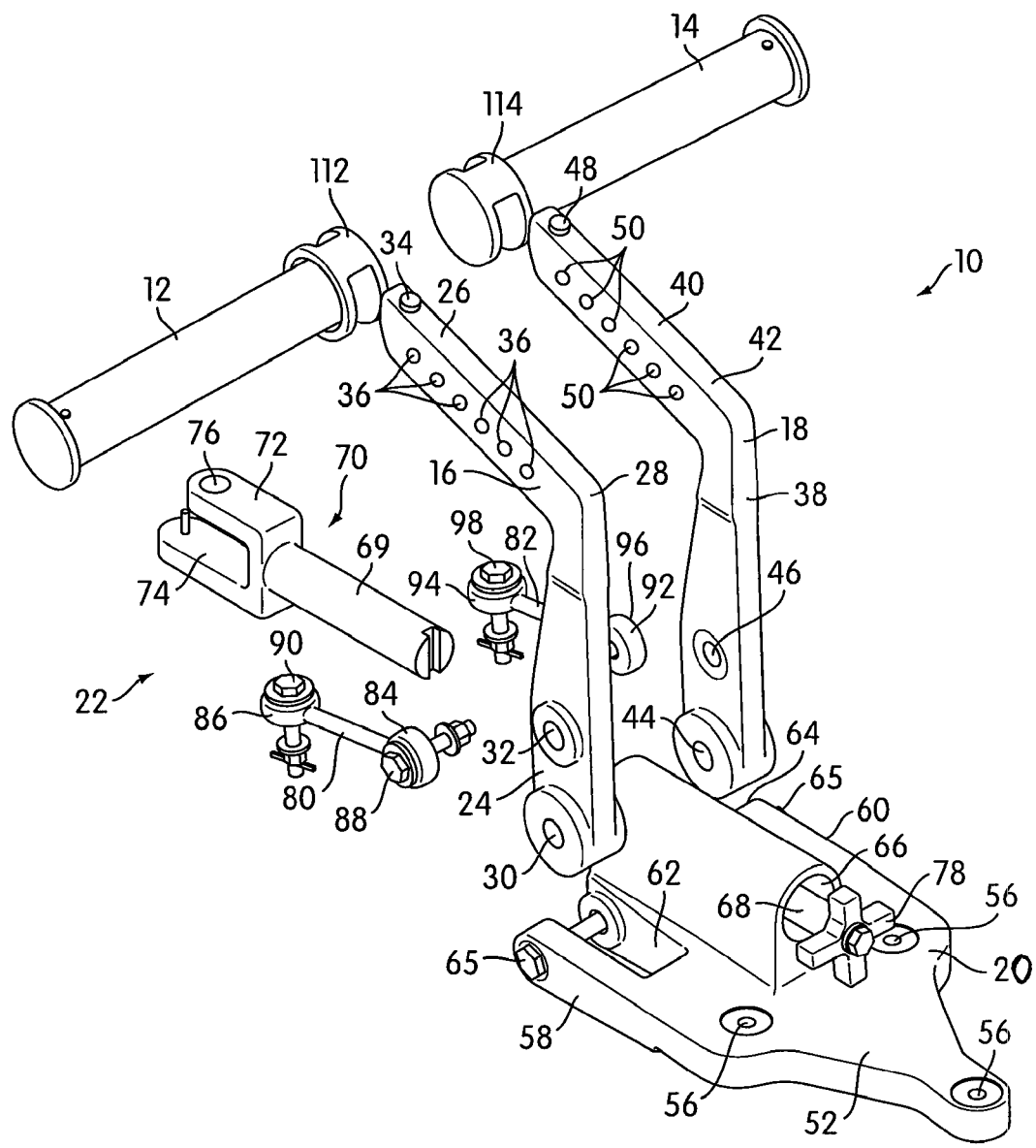
FIG. 1 illustrates an exploded view of a pedal system, in accordance with one or more embodiments of the invention.

FIG. 1 illustrates an exploded view of a pedal system 10. Pedal system 10 may include a first pedal 12 and a second pedal 14 that are adapted to provide a control interface for a user. For example, pedal system 10 may be provided as a control interface in an aviation control system (e.g., for a helicopter, for a fixed-wing plane, etc.). In order to input control information via pedal system 10, the user may engage one or both of pedals 12 and 14. In one embodiment, pedal system 10 further includes a first lever 16, a second lever 18, a support base 20, and an adjustment assembly 22.

First lever 16 includes a root portion 24 and a terminal portion 26. Root portion 24 and terminal portion 26 come together at a bend 28 in first lever 16 of a first predetermined angle. The first predetermined angle may be formed such that root portion 24 and terminal portion 26 are not substantially perpendicular. In one embodiment, the first predetermined angle may be between about 85°-115°. For example, the predetermined angle may be about 103°.

At root portion 24, first lever 16 forms a pivot channel 30 and a crank couple channel 32 that run through first lever 16. Pivot channel 30 is adapted to enable a member to be provided therethrough. The member provided to run through pivot channel 30 then becomes an axis of rotation, about which first lever 16 is rotatable. Crank couple channel 32 is adapted to enable root portion 24 to be coupled with a crank, as is further discussed below.

At terminal portion 26, first lever 16 includes a stop 34 and forms a plurality of locking channels 36. In one embodiment, locking channels 36 run through terminal portion 26 of first lever 16.

In one embodiment, second lever 18 is a mirror image of first lever 16. As such, second lever 18 includes a root portion 38 and a terminal portion 40. Root portion 38 and terminal portion 40 come together at a bend 42 in second lever 18 of a second predetermined angle. The second predetermined angle may be formed such that root portion 38 and terminal portion 40 are not substantially perpendicular. In one embodiment, the second predetermined angle is equal to the first predetermined angle. For example, the second predetermined angle may be between about 85°-115°. As a more particular (but still non-limiting) example, the second predetermined angle may be about 103°.

At root portion 38, second lever 18 forms a pivot channel 44 and a crank couple channel 46 that run through second lever 18. Pivot channel 44 is adapted to enable a member to be provided therethrough. The member provided to run through pivot channel 44 then becomes an axis of rotation, about which second lever 18 is rotatable. Crank couple channel 46 is adapted to enable root portion 38 to be coupled with a crank, as is further discussed below.

At terminal portion 40, second lever 18 includes a stop 48 and forms a plurality of locking channels 50. In one embodiment, locking channels 50 run through terminal portion 40 of second lever 18.

As is shown in FIG. 1, support base 20 is a plate-like structure that includes a main body 52 and a track 54. Main body 52 forms a plurality of mounting channels 56 that are adapted to receive fasteners to mount support base 20 to an underlying support surface (e.g., a floor of an aircraft, etc.). A first arm 58 extends from one side of main body 52, and a second arm 60 extends from a second side of main body 52 opposite from first arm 58. First arm 58 cooperates with main body 52 to form a first cutout 62, and second arm 60 cooperates with main body 52 to form a second cutout 64. A pivot channel 63 is formed along a substantially straight axis to run through each of first arm 58, main body 52, and second arm 60. First cutout 62 and second cutout 64 are adapted to receive root portions 24 and 38 of first and second levers 16 and 18, respectively, such that a member (e.g., such as a fastener) 65 can be run through pivot channel 63 and each of pivot channels 30 and 44 to rotatably mount root portions 24 and 38 to support base 20 within cutouts 62 and 64, respectively. As can be seen in FIG. 1, track 54 of support base 20 protrudes out of main body 52 between cutouts 62 and 64, and forms a guide channel 66 that runs through track 54.

In one embodiment, adjustment assembly 22 includes a threaded drive 68 and a crank pivot 70. Threaded drive 68 includes an elongated, threaded member, such as a bolt or other threaded member. The size and thread pitch of threaded drive 68 is determined to coordinate with the size and thread pitch of threaded channel 66 formed by support base 20. Crank pivot 70 includes a threaded socket that interfaces with one end of threaded drive 68 such that as threaded drive 68 is rotated, the threads of threaded drive 68 interact with the threads of threaded socket 69 to drive crank pivot 70 within guide channel 66. Crank pivot 70 includes a first arm 72 and a second arm 74, each of which include openings, formed to enable a crank to be rotatably mounted therebetween by providing a fastener 76 through each of first arm 72, second arm 74, and the crank. For example, a bell crank may be rotatably mounted between first arm 72 and second arm 74.

In one embodiment, adjustment assembly 22 includes an actuation member 78 that is attachable to an end of threaded drive 68 opposite from crank pivot 70. Actuation member 78 may be designed to enable the user to engage member 78 to drive crank pivot 70 within guide channel 66. For example, actuation member 78 may include a knob, a lever arm, or other members that can be engaged by a user to apply a torque thereto.

In the embodiments illustrated in FIG. 1, pedal system 10 includes a first crank couple 80 and a second crank couple 82. First crank couple 80 includes a lever opening 84 and a crank opening 86 formed therein. The orientation of lever opening 84 is roughly perpendicular to the orientation of crank opening 86. Lever opening 84 is formed in first crank couple 80 to enable a fastener 88 to be provided through lever opening 84 and crank couple channel 32 of first lever 16 to rotatably couple first crank couple 80 to first lever 16. Crank opening 86 is formed in first crank couple 80 to enable a fastener 90 to be provided through crank opening 86 and an opening in a crank (e.g., a crank rotatably mounted to crank pivot 70 of adjustment assembly 22) to rotatably couple first crank couple 80 to the crank.

Similarly to first crank couple 80, second crank couple 82 includes a lever opening 92 and a crank opening 94 formed therein. The orientation of lever opening 92 is roughly perpendicular to the orientation of crank opening 94. Lever opening 92 is formed in second crank couple 82 to enable a fastener 96 to be provided through lever opening 92 and crank couple channel 44 of second lever 18 to rotatably couple second crank couple 82 to second lever 18. Crank opening 94 is formed in second crank couple 82 to enable a fastener 98 to be provided through crank opening 94 and an opening in a crank (e.g., a crank rotatably mounted to crank pivot 70 of adjustment assembly 22) to rotatably couple second crank couple 82 to the crank.

Figure 2:
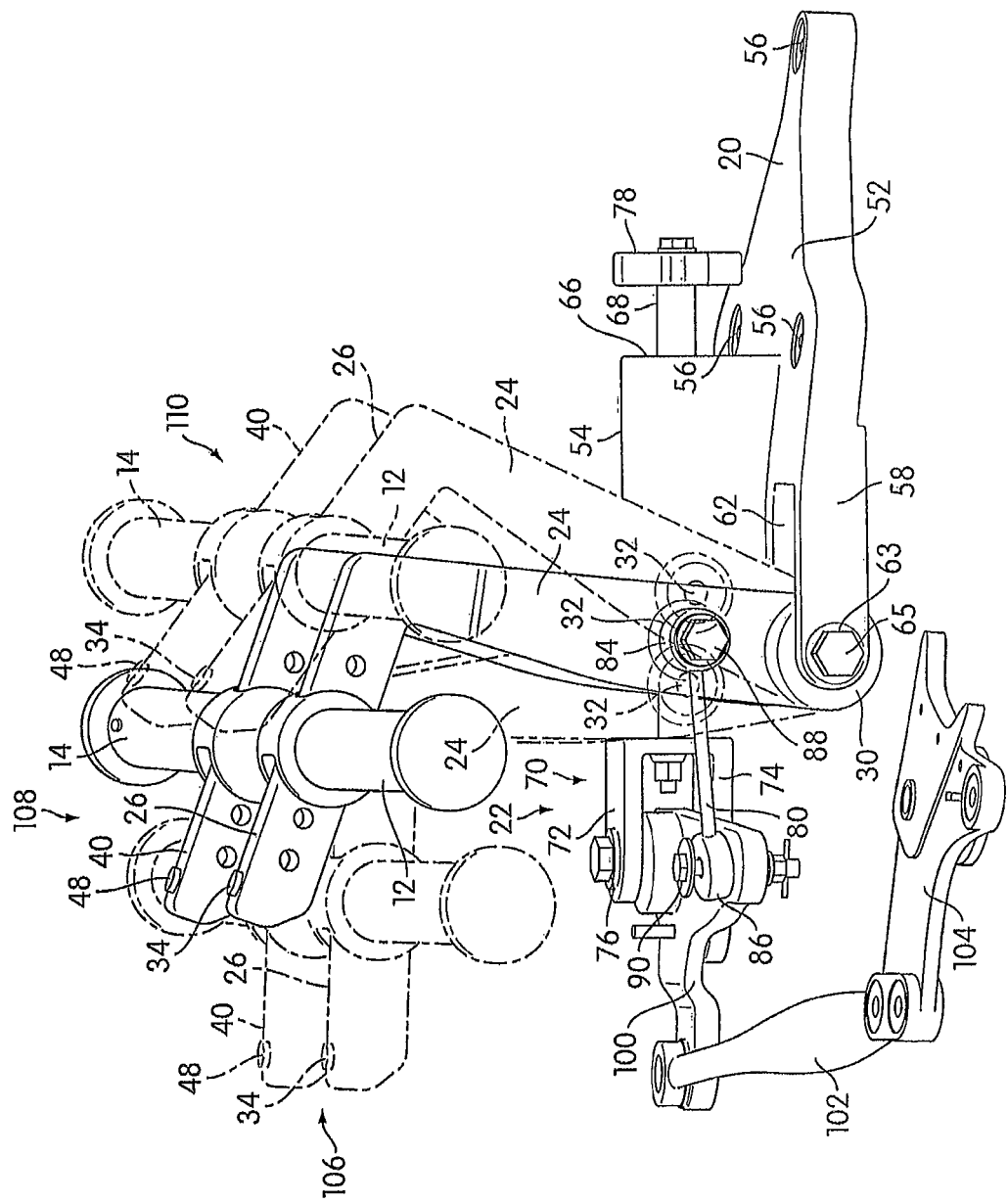
FIG. 2 illustrates a side view of a pedal system, according to one more embodiments of the invention.

Turning to FIG. 2, a side view of pedal system 10 is shown, according to one or more embodiments of the invention. As is illustrated, when pedal system 10 is assembled, root portions 24 and 38 of first and second levers 16 and 18 are rotatably mounted to support base 22, with member 65 acting as an axis of rotation about which each of first and second levers 16 and 18 rotate. Or, first lever 16 is rotatably mounted to support base 22 to rotate in a first plane of rotation about the axis of rotation formed by member 65, and second lever 18 is rotatably mounted to support base 22 to rotate in a second plane of rotation about the axis of rotation formed by member 65. As can be seen, the first and second planes of rotation of first and second lever 16 and 18 are substantially parallel.

Further, pedals 12 and 14 are mounted to terminal portions 26 and 40 of levers 16 and 18. More particularly, first pedal 12 is mounted to terminal portion 26 of first lever 16 to extend therefrom in a direction that is (i) away from second lever 18, and (ii) roughly parallel to the axis of rotation formed by member 65. Similarly, second pedal 14 is mounted to terminal portion 40 of second lever 18 to extend therefrom in a direction that is (i) away from first lever 16, and (ii) roughly parallel to the axis of rotation formed by member 65.

In the view shown in FIG. 2, a crank 100 is rotatably mounted to adjustment assembly 22 between first and second arms 72 and 74, in the manner described above. Further, crank 100 is coupled to first and second levers 16 and 18 via crank couples 80 and 82, as discussed previously. Thus, by applying a force to either of first or second pedals 12 and 14 to rotate a corresponding one of first or second levers 16 and 18 about the axis of rotation formed by member 65, the user will pivot crank 100 about fastener 76. In one embodiment, the actuation of crank 100 about fastener 76 by the user (e.g., via the actuation of first pedal 12 and/or second pedal 14) may be implemented by a control system to receive input from the user. For example, an arm 102 may couple crank 100 to a second crank 104, and the actuation of second crank 104 by arm 102 may be used as input to the control system.

When pedal system 10 is assembled (e.g., as shown in FIG. 2), levers 16 and 18 have a default rotational orientation about the axis of rotation formed by member 65. In the absence of a force applied to one or both of pedals 12 and 14 by the user, levers 16 and 18 will remain at this default rotational orientation. One of the features provided pedal system 10 is the adjustability of the default rotational orientation about the axis or rotation formed by member 65. For example, FIG. 2 shows levers 16 and 18 in a full forward default rotational orientation 106, a neutral default rotational orientation 108, and a full aft default rotational orientation 110. The adjustment of the default rotational orientation may enable customization of the position of pedals 12 and 14 to accommodate users with different physical geometries and/or preferences.

As can be appreciated from FIG. 2, levers 16 and 18 are held in position at the default rotational orientation by virtue of (i) their mount to support base 22 (e.g., by member 65), and (ii) their couple to crank 100 (e.g., via crank couples 80 and 82). Therefore, by enabling the position of crank 100 to be adjusted with respect to support base 22 (as discussed below), pedal system 10 enables the adjustment of the rotational orientation of levers 16 and 18.

In order to adjust the position of crank 100 with respect to support base 22, threaded drive 68 is provided within guide channel 66 of track 54 to interact with threaded socket 69 of crank pivot 70 as described above. By virtue of the interaction between the threads of threaded drive 68 and threaded socket 69, the user is able to drive crank pivot 70 by rotating actuation member 78. As the user drives crank pivot 70 toward or away from track 54, the default position of levers 16 and 18 are adjusted.

By way of illustration, at full forward default rotational orientation 106, crank pivot 70 is driven toward track 54 a maximum allowed amount. At full aft default rotational orientation 110, crank pivot 70 is withdrawn from track 54 a maximum allowed amount. At neutral default rotational orientation 108, crank pivot 70 is positioned exactly between its positions at full forward default rotational orientation 106 and full aft default rotational orientation 110.

It should be appreciated that the use of threaded drive 68 and threaded socket 69 to adjust the position of crank pivot 70, in order to adjust the default rotational orientation of levers 16 and 18, is for illustration only. In other embodiments, other mechanisms for securely advancing and/or withdrawing crank pivot 70 toward and/or away from track 54 may be implemented. For example, pedal system 10 may include a relatively smooth shaft that is mounted to crank pivot 70, and the shaft may be securely advanced and/or withdrawn along track 54 by securely and releasably gripping the shaft (e.g., via a clamping mechanism) within track 54 at a desired position.

Figure 3:
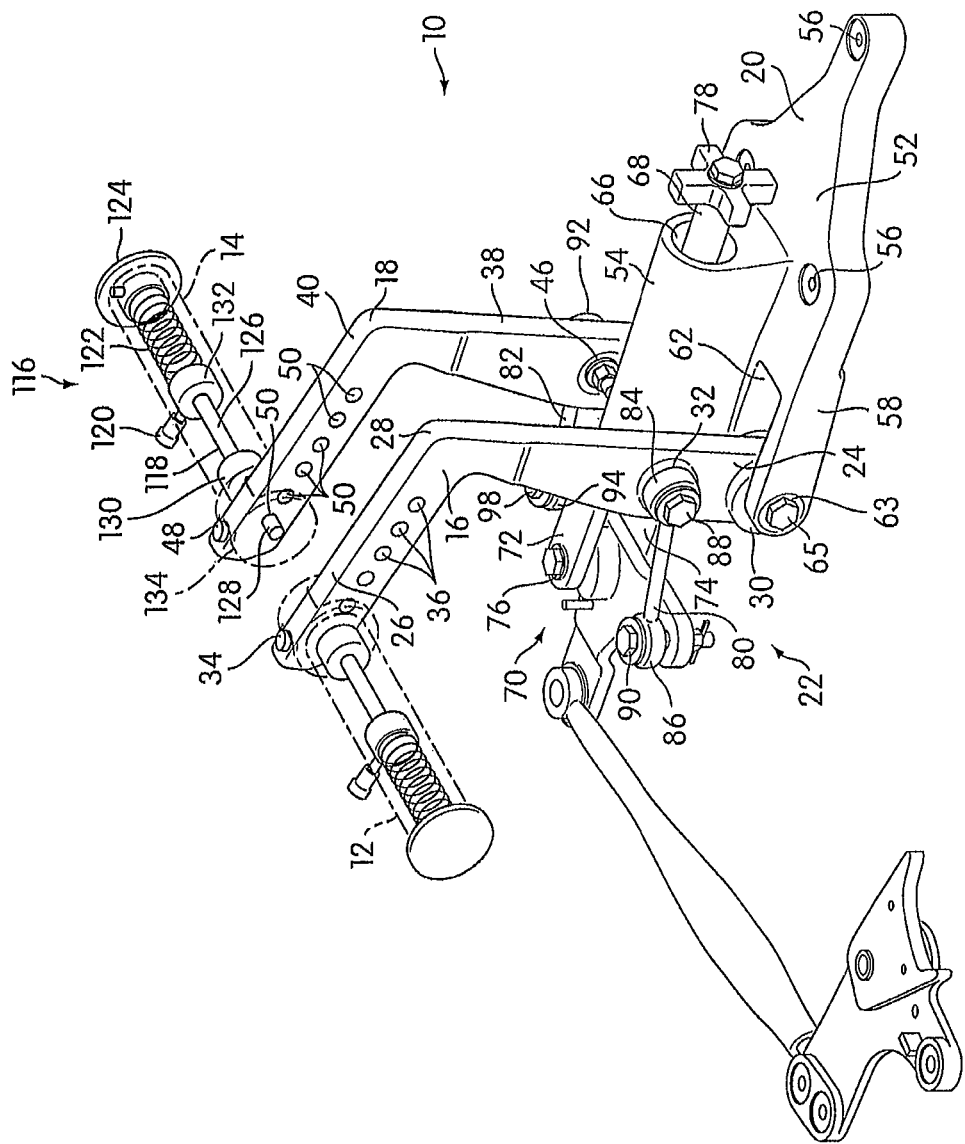
FIG. 3 illustrates a perspective view of a pedal system, in accordance with one or more embodiments of the invention.

Referring to FIG. 3, a perspective view of pedal system 10 is shown, in accordance with one or more embodiments of the invention. In particular, FIG. 3 illustrates a main body 112 of second pedal 14 as transparent, in order to show various aspects of the operation of system 10. Although some of these aspects are described below solely with respect to second pedal 14, it should be appreciated that first pedal 12 operates in substantially the same manner.

As can be seen in FIG. 3, second pedal 14 includes a second pedal carriage 114. Second pedal carriage 114 is configured to slidingly engage terminal portion 40 of second lever 18. This may enable second pedal 14 to slide between positions on terminal portion 40 without being completely decoupled from second lever 18. Second pedal 14 is secured in place by a locking mechanism 116 configured to releasably hold second pedal carriage 114 at a selectable fixed position along terminal portion 40 of second lever 18. In one embodiment, locking mechanism 116 includes a locking pin 118, an actuation member 120, a resilient member 122 (e.g., a spring, a rubber member, etc.), and an endcap 124.

Locking pin 118 includes a pin member 126 with a protruding end 128, a first stop 130, provided adjacent to protruding end 128, and an end stop 132 formed on an end of pin member 126 opposite from protruding end 128. As is shown in FIG. 3, pin member 126 is formed with a cross section such that protruding end 128 is able to fit within a selected one of locking channels 50 formed along terminal portion 40, and a pin opening 134 formed in second pedal carriage 114, thereby securing second pedal carriage 114 in a fixed position along terminal portion 40 with respect to the selected locking channel 50. Resilient member 122 applies a bias to locking pin 118 at end stop 132 that biases protruding end 128 into channel 50 and opening 134. First stop 130 engages an inner surface of main body 112 of pedal 14 to stop locking pen 118 at an appropriate position. Actuation member 120 is coupled with pin member 126, and extends from its couple with pin member 126 to without main body 112. For example, in one embodiment, main body 112 includes an opening or slot (not visible in the view of FIG. 3) from which actuation member 12 protrudes. In order to over come the bias applied by resilient member 122 to locking pin 118 to release protruding end 128 from locking channel 50 and enable second pedal carriage 114 to slide along terminal portion 40 to a new position, the user may engage actuation member 120 and actuate it away from terminal portion 40. By actuation of actuation member 120, the user causes a compressive force to be applied to resilient member 122 by end stop 132 and releases protruding end 128 from locking channel 50.

Once protruding end 128 is released from locking channel 50, the user can move second pedal carriage 114 along terminal end 40 until it is positioned according to the desire of the user (e.g., for comfort, convenience, etc.). At that point, the user releases actuation member 120, and resilient member 122 again biases locking pin 118 toward terminal portion 40. The user may further adjust the position of second pedal carriage 114 until protruding end 128 lines up with one of locking channels 50, and engages the channel 50, thereby securing second pedal carriage 114 (and second pedal 14) in place along terminal portion 40.

It should be appreciated from the foregoing description, and the depiction of pedal system 10 in FIG. 3, that the adjustment of second pedal 14 along second lever 18 is distinct and separate from the positioning of first pedal 12 along first lever 16. Further, as was mentioned above, the position of first pedal 12 along first lever 16 may be adjusted in substantially the same manner as the adjustments of second pedal 14. As such, pedal system 10 enables the individual adjustment each of first and second pedals 12 and 14 to provide the user with an enhanced customizability of pedal system 10.

In some embodiments, as the default rotational orientation of first and second levers 16 and 18 is adjusted (e.g., as described above), some of the possible positions of first and/or second pedals 12 and 14 along terminal portions 26 and 40 may not be comfortably usable for practical purposes. For example, at various default rotational orientations, some of the possible positions of first and/or second pedals 12 and 14 may become too high or too low to be comfortable for typical users. As a specific example, it should be appreciated that as the default rotational orientation of first and second levers 16 and 18 approaches full forward default rotational orientation 106 (as shown in FIG. 2), positions for pedals 12 and 14 toward the extreme distal ends of terminal portions 26 and 40 may become too low for the comfort and/or convenience of users. This may be particularly true in instances when the first and second predetermined angles between terminal portions 26 and 40 and root portions 24 and 38, respectively, approach 90° (or perpendicularity). As another specific example, it should also be appreciated that as the default rotational orientation of first and second levers 16 and 18 approaches full aft default rotational orientation 110 (as shown in FIG. 2), positions for pedals 12 and 14 toward the extreme distal ends of terminal portions 26 and 40 may become too high for the comfort and/or convenience of users. This may be particularly true in instances where the first and second predetermined angles between terminal portions 26 and 40 and root portions 24 and 38, respectively, are relatively less than 90°. Therefore, first and second levers 16 and 18 may be formed with first and second predetermined angles that enhance the amount of usable positions for pedals 12 and 14 that are provided by pedal system 10. To this end (among other things), first and second predetermined angles may be between about 90°-110°. In one embodiment, the first and second predetermined angles may be about 103°.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A pedal system comprising:
    a support base;
    a first lever comprising a root portion and a terminal portion formed such that the terminal portion interfaces with the root portion at a bend in the first lever of a first predetermined angle, the root portion of the first lever being pivotally mounted to the support base such that the first lever is rotatable in a first plane of rotation about an axis of rotation at or near the support base;
    a second lever comprising a root portion and a terminal portion formed such that the terminal portion interfaces with the root portion at a bend in the second lever of a second predetermined angle, the root portion of the second lever being pivotally mounted to the support base such that the second lever is rotatable in a second plane of rotation about the axis of rotation, wherein the second plane of rotation is substantially parallel to the first plane of rotation and wherein the first plane of rotation is separate from the second plane of rotation;
    a first pedal configured to be engaged by a foot of a user to rotate the first lever about the axis of rotation, the first pedal being attached to the first lever to extend therefrom in a direction that is (i) away from the second lever, and (ii) substantially parallel to the axis of rotation, the first pedal being attached to the first lever such that the position of the first pedal is adjustable along the terminal portion of the first lever;
    a second pedal configured to be engaged by a foot of the user to rotate the second lever about the axis of rotation, the second pedal being attached to the second lever to extend therefrom in a direction that is (i) away from the first lever, and (ii) substantially parallel to the axis of rotation, the second pedal being attached to the second lever such that the position of the second pedal is adjustable along the terminal portion of the second lever separate from the adjustment of the first pedal along the terminal portion of the first lever,
    wherein, if no external force is applied to the first lever, the first lever is held at a default rotational orientation about the axis of rotation and, if no external force is applied to the second lever, the second lever is held at the same default rotational orientation about the axis of rotation, the pedal system further comprising an adjustment assembly that enables the user to adjust the same default rotational orientation of the first and the second lever.

2. The pedal system of claim 1, wherein the first predetermined angle and the second predetermined angle are substantially equal.

3. The pedal system of claim 1, wherein the first predetermined angle and the second predetermined angle are not substantially 90 degrees.

4. The pedal system of claim 1, wherein the first predetermined angle and the second predetermined angle are between about 90°-110°.

5. The pedal system of claim 1, wherein the first pedal comprises:
    a first pedal carriage configured to slidingly engage the terminal portion of the first lever such that the first pedal carriage is capable of sliding along the terminal portion of the first lever to adjust the position of the first pedal along the terminal portion of the first lever; and
    a first locking mechanism configured to releasably hold the first pedal carriage at a fixed position along the terminal portion of the first lever.

6. The pedal system of claim 5, wherein the second pedal comprises:
    a second pedal carriage configured to slidingly engage the terminal portion of the second lever such that the second pedal carriage is capable of sliding along the terminal portion of the second lever to adjust the position of the second pedal along the terminal portion of the second lever; and
    a second locking mechanism configured to releasably hold the second pedal carriage at a fixed position along the terminal portion of the second lever.

7. The pedal system of claim 1, wherein the first plane is substantially perpendicular to the axis of rotation.

8. The pedal system of claim 1, wherein the first and the second lever are both coupled to a same crank so that rotation of the first lever, or the second lever or both the first and the second lever actuates the crank.

9. The pedal system of claim 8, wherein the adjustment assembly enables the user to adjust the same default rotational orientation of the first and second levers without actuating the crank.

10. A pedal system comprising:
a support base;
a first lever comprising a root portion and a terminal portion, the root portion of the first lever being pivotally mounted to the support base such that the first lever is rotatable as a single body in a first plane of rotation about an axis of rotation at or near the support base;
a second lever comprising a root portion and a terminal portion, the root portion of the second lever being pivotally mounted to the support base such that the second lever is rotatable as a single body in a second plane of rotation about the axis of rotation, wherein the second plane of rotation is substantially parallel to the first plane of rotation and wherein the first plane of rotation is separate from the second plane of rotation;
a first pedal configured to be engaged by a foot of a user to rotate the first lever about the axis of rotation from a default rotational orientation about the axis of rotation, wherein the first lever is coupled to a crank such that rotation of the first lever from the default rotational orientation actuates the crank, the first pedal being attached to the first lever to extend therefrom in a direction that is (i) away from the second lever, and (ii) substantially parallel to the axis of rotation, the first pedal being attached to the first lever such that the position of the first pedal is adjustable along the first lever;
a second pedal configured to be engaged by a foot of the user to rotate the second lever about the axis of rotation from the default rotational orientation about the axis of rotation, wherein the second lever is coupled to the crank such that rotation of the second lever from the default rotational orientation actuates the crank, the second pedal being attached to the second lever to extend therefrom in a direction that is (i) away from the first lever, and (ii) substantially parallel to the axis of rotation, the second pedal being attached to the second lever such that the position of the second pedal is adjustable along the terminal portion of the second lever separate from the adjustment of the first pedal along the terminal portion of the first lever; and
an adjustment assembly that enables the user to adjust the default rotational orientation of the first and second levers without actuating the crank.

11. The pedal system of claim 10, wherein the adjustment assembly comprises:
a crank pivot configured such that the crank is rotatably mounted to the crank pivot to rotate about a crank pivot point provided on the crank pivot; and
a carriage that carries the crank pivot, the carriage being slidably mounted to the support base, wherein sliding the carriage along the support base moves the crank pivot, thereby adjusting the default rotational orientation of the first and second levers without actuating the crank about the crank pivot point.

12. The pedal system of claim 11, wherein the adjustment assembly comprises a carriage actuation member that is engagable by the user to drive the carriage along the support base.

13. The pedal system of claim 12, wherein the carriage actuation member may include a knob.

14. The pedal system of claim 12, wherein the first lever comprises a root portion and a terminal portion formed such that the terminal portion interfaces with the root portion at a bend in the first lever of a first predetermined angle, the root portion of the first lever being pivotally mounted to the support base.

15. The pedal system of claim 14, where in the second lever comprises a root portion and a terminal portion formed such that the terminal portion interfaces with the root portion at a bend in the second lever of a second predetermined angle, the root portion of the second lever being pivotally mounted to the support base.

16. The pedal system of claim 15, wherein the first predetermined angle and the second predetermined angle are substantially equal.

17. The pedal system of claim 15, wherein the first predetermined angle and the second predetermined angle are not substantially 90 degrees.

18. The pedal system of claim 15, wherein the first predetermined angle and the second predetermined angle are between about 90°-110°.

19. A pedal system comprising:
a support base;
a first lever comprising a root portion and a terminal portion extending therefrom, the root portion and the terminal portion forming a fixed angle in the first lever, the root portion of the first lever being pivotally mounted to the support base such that the first lever is rotatable in a first plane of rotation about an axis of rotation at or near the support base;
a second lever comprising a root portion and a terminal portion extending therefrom, the root portion and the terminal portion forming a fixed angle in the second lever, the root portion of the second lever being pivotally mounted to the support base such that the second lever is rotatable in a second plane of rotation about the axis of rotation, wherein the second plane of rotation is substantially parallel to the first plane of rotation and wherein the first plane of rotation is separate from the second plane of rotation;
a first pedal configured to be engaged by a foot of a user to rotate the first lever about the axis of rotation, the first pedal being attached to the terminal portion of the first lever to extend therefrom in a direction that is (i) away from the second lever, and (ii) substantially parallel to the axis of rotation, the first pedal being adjustable along the terminal portion of the first lever;
a second pedal configured to be engaged by a foot of the user to rotate the second lever about the axis of rotation, the second pedal being attached to the second lever to extend therefrom in a direction that is (i) away from the first lever, and (ii) substantially parallel to the axis of rotation, the second pedal being adjustable along the terminal portion of the second lever separate from the adjustment of the first pedal along the terminal portion of the first lever,
wherein the first and the second lever are both coupled to a same crank so that rotation of the first lever, or the second lever or both the first and the second lever actuates the crank.

20. The pedal system of claim 19, further comprising an adjustment assembly that enables the user to adjust the default rotational orientation of the first and second levers without actuating the crank.

* * * * *